(12) United States Patent
Nicolaescu et al.

(10) Patent No.: US 7,976,168 B2
(45) Date of Patent: Jul. 12, 2011

(54) IMAGE PROJECTOR WITH INTERNALLY TILED INTERMEDIATE IMAGES

(75) Inventors: Ion V. Nicolaescu, Carpentersville, IL (US); Tomasz L. Klosowiak, Glenview, IL (US); Zili Li, Barrington, IL (US); Xiaodong Xun, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 655 days.

(21) Appl. No.: 12/046,959

(22) Filed: Mar. 12, 2008

(65) Prior Publication Data
US 2009/0231494 A1   Sep. 17, 2009

(51) Int. Cl.
G03B 21/26 (2006.01)
G03B 21/14 (2006.01)
G02B 23/24 (2006.01)
G02B 1/10 (2006.01)
G02B 27/12 (2006.01)

(52) U.S. Cl. ............ 353/30; 353/20; 353/94; 359/434; 359/583; 359/639

(58) Field of Classification Search .............. 353/30, 353/20, 94; 359/434, 583, 629, 639
See application file for complete search history.

(56) References Cited

U.S. PATENT DOCUMENTS

| | | | | |
|---|---|---|---|---|
| 6,439,725 | B1 * | 8/2002 | Na | 353/31 |
| 6,769,772 | B2 * | 8/2004 | Roddy et al. | 353/31 |
| 6,833,951 | B2 * | 12/2004 | Kolosowsky | 359/460 |
| 7,224,411 | B2 * | 5/2007 | Gibbon et al. | 348/757 |
| 2006/0055891 | A1 * | 3/2006 | Florence et al. | 353/20 |
| 2008/0284920 | A1 * | 11/2008 | Facius et al. | 348/751 |

FOREIGN PATENT DOCUMENTS

| | | |
|---|---|---|
| WO | W002054148 A2 | 7/2002 |
| WO | W02005074258 A1 | 8/2005 |
| WO | W02006049771 A2 | 5/2006 |

* cited by examiner

*Primary Examiner* — Georgia Y Epps
*Assistant Examiner* — Magda Cruz (57) ABSTRACT

Disclosed are a system and method for microprojection that uses multiple imagers to produce a high resolution output image. Each of a set of imagers produces a portion of the final image. Relay lenses then tile the individual image portions together into a combined image. Because the height of the individual imagers is smaller than the height of a monolithic imager, they can fit into a very thin device. The combined image has a resolution equal to the sum of the resolutions of the individual imagers. The individual images are tiled together within the microprojector itself rather than on a projection screen. This allows the tiling to be adjusted once at the factory and set forever. In some embodiments, the light created for use by the microprojector is split by a polarizing beamsplitter. Each resultant polarized beam is then sent to an imager. Another polarizing beamsplitter combines the individual images.

12 Claims, 6 Drawing Sheets

IMAGE PROJECTOR WITH INTERNALLY TILED INTERMEDIATE IMAGES

CROSS REFERENCES TO RELATED APPLICATIONS

The subject matter of this patent application is related to that of U.S. patent application Ser. No. 11/687,884, filed on Mar. 19, 2007.

FIELD OF THE INVENTION

The present invention is related generally to projection of optical images, and, more particularly, to optical-image projectors subject to space limitations.

BACKGROUND OF THE INVENTION

A trend in personal portable devices (such as cell phones and personal digital assistants) is to add new features while keeping the devices small. Many of the new features, such as photograph sharing and video downloading, depend upon a high resolution, easy-to-read display screen. However, manufacturers cannot simply keep increasing the size of their display screens because that would eventually run counter to the desire to keep the devices small and portable.

Recently, "microprojectors," a new category of display device, have been designed to address this conflict between greater display area and smaller device size. An image, either still or moving, is projected from the device onto a convenient surface (e.g., a projection screen or an office wall). The maximum size of the image is then effectively constrained by the amount of available wall space rather than by the size of the device itself. Using a microprojector-equipped device, several people can simultaneously view a photograph, for example, or review a full page of text, neither of which can be readily done with even the largest displays on current personal portable devices.

Promising as they are, microprojectors raise new headaches when engineers attempt to fit them into personal portable devices. While the overall size of the projected image may be effectively unlimited, expanding the image size is of little use if the resolution of the projected image is severely constrained. What customers want is a projected image that is both larger overall and has much greater resolution than a device's display screen. But, generally, the overall size of a microprojector grows with the amount of resolution it provides. This is especially true when a microprojector uses a microdisplay imager as its image source. The trend toward very thin personal portable devices renders it a challenge to fit in a microprojector that provides usefully high resolution.

Power use is another challenge. By its nature, a microprojector uses a significant amount of power to light a large display area. In addition, microprojectors usually use proven liquid-crystal displays which only work with linearly polarized light. Light created for use by the microprojector is first sent through a polarizer, a component that discards about half of the original light and thus discards about half of the power. Reducing the physical size of the microprojector exacerbates the power problem because the optics in microprojectors become less power-efficient as they become smaller. Designers of battery-based personal portable devices are already concerned about their power budgets and look askance at any new feature that threatens to reduce the utility of the device by reducing how long the device can operate between charges.

BRIEF SUMMARY OF THE INVENTION

The above considerations, and others, are addressed by the present invention, which can be understood by referring to the specification, drawings, and claims. According to aspects of the present invention, a microprojector uses multiple imagers to produce a high resolution output image and avoids the use of very small imager optics with their lowered efficiency.

Each of a set of imagers produces a portion of the final image. Relay lenses then tile the individual image portions together into a combined image. Because the height of the individual imagers is smaller than the height of a monolithic imager, they can fit into a very thin device. The combined image, on the other hand, has a resolution equal to the sum of the resolutions of the individual imagers.

In some embodiments, for example, two imagers are placed side by side. One imager produces the top half of the combined image, and the other imager produces the bottom half. When the two halves are combined, the combined image has a horizontal resolution equal to that of each imager and a vertical resolution equal to the sum of the vertical resolutions of the individual imagers.

The individual images are tiled together within the microprojector itself rather than on a projection screen. This allows the tiling to be adjusted once at the factory and set forever. Changing the distance between the projection lens and the display screen does not affect the tiling adjustment. This provides both higher tiling-image quality and much needed convenience for the consumer. Furthermore, it allows the use of a simple optical design for the projector.

In some embodiments, the light created for use by the microprojector is split by a polarizing beamsplitter. Each resultant polarized beam is then sent to an imager. Another polarizing beamsplitter combines the individual images. This technique uses essentially all of the original light, doubling the lighting efficiency of previous devices.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

Figure 1:
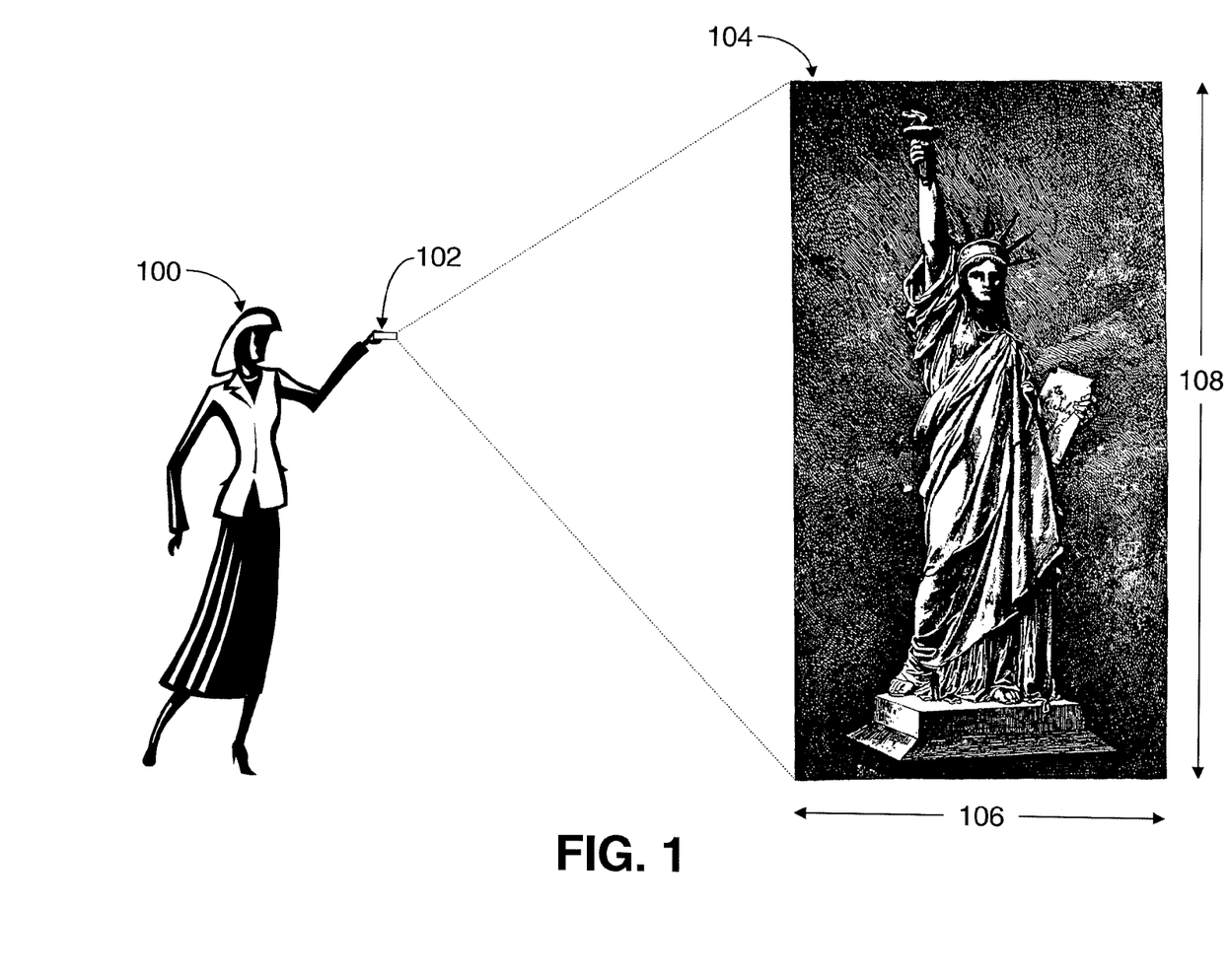
FIG. 1 is an overview of a representative environment in which aspects of the present invention can be practiced.

In FIG. 1, a user 100 is projecting an image 104 from her personal portable device 102. The image 104 could be, for example, a photograph, a video, or a computerized display from a word processor or an Internet browser. The image 104 may be projected onto a screen or even onto a wall or ceiling. By projecting the large, high resolution image 104 rather than presenting it on a (necessarily small) display screen of her personal portable device 102, the user 100 can invite others to share the image 104 with her.

The resolution of a digital image is defined as the product of its horizontal resolution and its vertical resolution. Resolution is measured in number of pixels. In FIG. 1, the image 104 has a horizontal resolution "Rx." Rx measures the number of addressable pixels in the horizontal direction and is indicated by 106 in FIG. 1. The vertical resolution "Ry" counts addressable pixels in the vertical direction and is indicated by 108. Note that here "horizontal" and "vertical" are merely convenient, and conventional, names for the two dimensions of a planar image, and are not confined to orientations taken with respect to the direction of gravity.

In a projector, an "imager" is a device that modulates light in order to imprint image information into a projected light beam. Generally, the resolution of a projected image is equal to the resolution of the imager that creates the image. Traditionally, including within the personal portable device 102 an imager that provides acceptable resolution for the projected image 104 makes the personal portable device 102 both thick and bulky. The present invention addresses this issue by allowing a small and thin personal portable device 102 to project a large, high resolution image 104.

Figure 2:
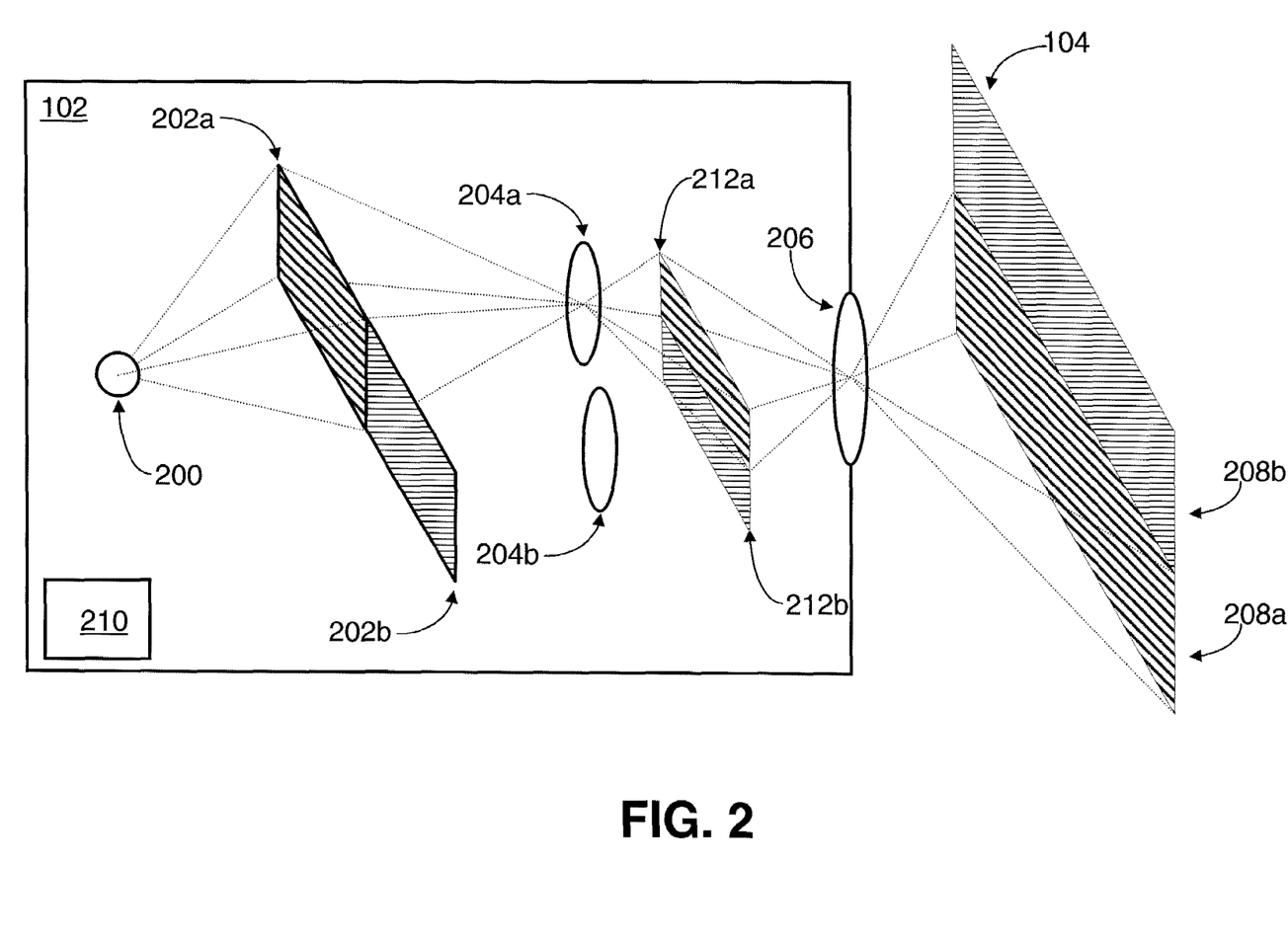
FIG. 2 is a simplified isometric view of an exemplary microprojector with two imagers.
Figure 3:
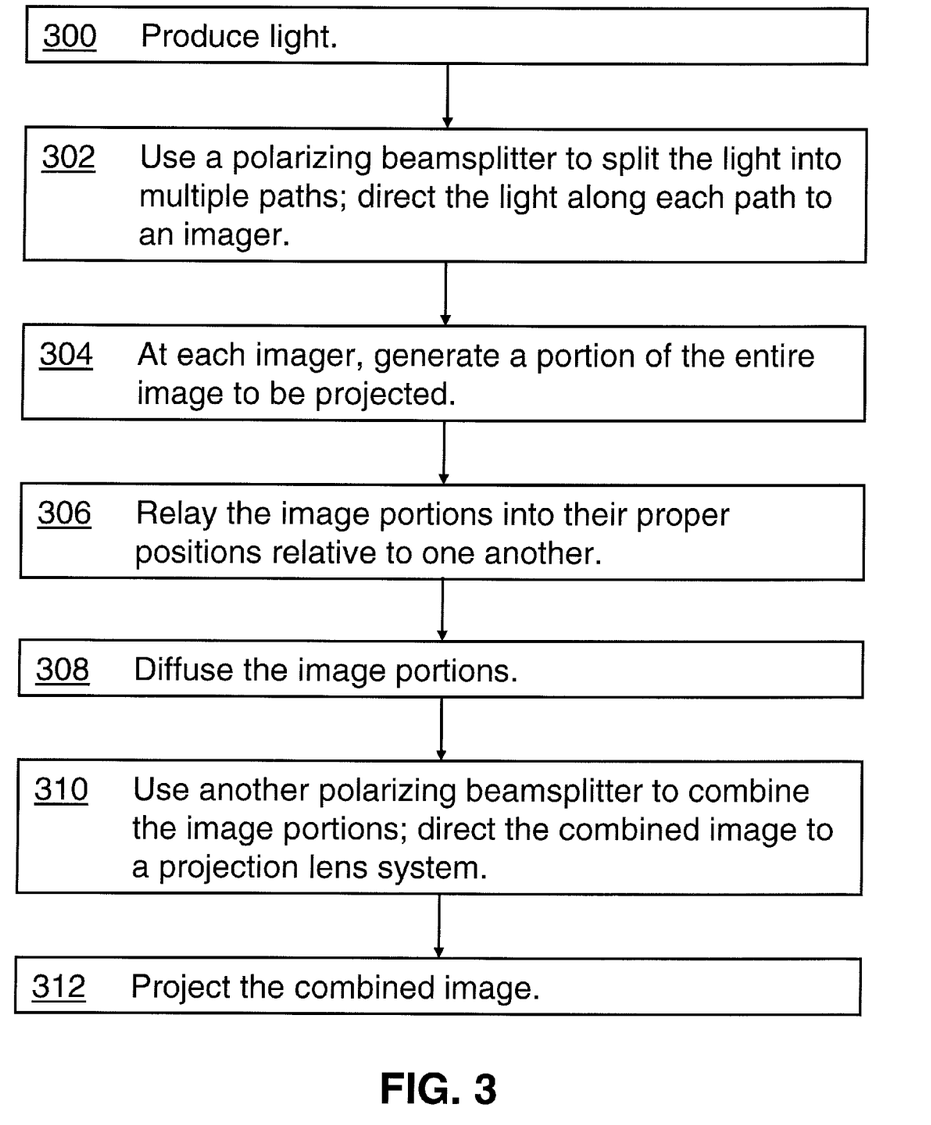
FIG. 3 is a flowchart of an exemplary embodiment of the present invention.

FIG. 2 shows how a microprojector made according to aspects of the present invention can achieve a high resolution in the projected image 104. FIG. 3 also illustrates embodiments of the present invention by following the light through the microprojector system. An illumination source 200 (discussed in greater detail below in reference to FIG. 4) produces light (Step 300 of FIG. 3). The light is directed toward multiple imagers 202a and 202b (second half of Step 302). (For clarity's sake, FIG. 2 only shows an idealized light path for one of the imagers 202a.) Each imager 202a and 202b generates a portion of the overall projected image 104 (Step 304). The light modulated by the imagers 202a and 202b is directed to relay lenses 204a and 204b (Step 306). The relay lenses 204a and 204b are so configured that they position the internal image portions 212a and 212b created by the imagers 202a and 202b so that when these internal image portions 212a and 212b are projected by the projection lens system 206 (Step 312), the image portions from the separate imagers are seamlessly combined into the overall image 104.

The illustrative implementation of FIG. 2 shows the imagers 202a and 202b as two physically separate entities. In some implementations, however, these logically separate imagers can be embodied in one physical entity, called here a "combined imager" to distinguish it from traditional monolithic imagers. A combined imager operating according to aspects of the present invention would operate in a manner similar to the manner discussed here for the separate imagers 202a and 202b. For example, a combined imager could be "long and thin" as suggested by FIG. 2 when compared to a traditional monolithic imager with the same overall resolution. Also for example, one section of the combined imager could create the internal image portion 212a, while another section creates the internal image portion 212b.

While the portions 208a and 208b of the final image 104 are stacked vertically in FIG. 2, FIG. 2 shows that the relay lenses 204a and 204b are so designed that the imagers 202a and 202b need not be stacked vertically but can reside side-by-side within the personal portable device 102. This side-by-side layout of the imagers 202a and 202b, each shorter in a vertical direction than a monolithic imager of the same overall resolution, permits the personal portable device 102 to remain small and thin.

The personal portable device 102 of FIG. 2 also includes controller logic and image memory 210. As directed by a user, the controller 210 retrieves image information and directs it to the imagers 202a and 202b for display. As the controller logic and image memory 210 are well known in the art, they are not further discussed here.

Because the final projected image 104 is produced by multiple imagers 202a and 202b, there is no need to include in the personal portable device 102 room for a single monolithic imager that has the same resolution as the final image 104. Instead, the system of FIG. 2 is arranged in such a way that the resolution of the final image 104 is the sum of the resolutions of the individual imagers 202a and 202b. If exactly two imagers are used in the system of FIG. 2, and if each imager 202a and 202b has a horizontal resolution equal to the horizontal resolution of the overall image 104, and if each imager 202a and 202b has half the vertical resolution of the overall image 104, then these two imagers 202a and 202b can, in combination, produce the total resolution of the overall image 104. In this case, the thickness of the personal portable device 102 is constrained only by the vertical dimension of the "half-height" imagers 202a and 202b rather than by the vertical dimension of a "full-height" imager. This example, and the arrangement of FIG. 2, can be extended to include more than two imagers. The addition of more imagers allows further reductions in the thickness of the personal portable device 102 while potentially adding complexity to the light paths.

Note again that "vertical" and "horizontal" are used here merely for convenience' sake and are used with respect to the figure under discussion. In most embodiments, the image 104 is expected to be projected from an end face of the personal portable device 102. The shape of the end face of many personal portable devices 102 approximates a long, thin rectangle. In some embodiments of the present invention, the projected image 104 roughly follows this shape. Thus, to project an image in "landscape" mode (that is, with a greater horizontal than a vertical dimension), the user 100 holds her personal portable device 102 "flat" (with the long edge of the face of the device 102 parallel to the ground). To project an image 104 in the "portrait" mode as shown in FIG. 1, the user 100 turns her personal portable device 102 so that the long edge of its end face is vertical. Known technology can be used to tell the personal portable device 102 of its orientation so that it can project the image 104 appropriately.

The imagers 202a and 202b shown in FIG. 2 are called "transmissive" imagers because they modulate light as it passes through them. "Reflective" imagers are also known and can be used in embodiments of the present invention. These imagers modulate light as it reflects off of them.

For simplicity's sake, the projection lens system 206 is drawn as a single lens in FIG. 2 (and in FIGS. 4, 5c, 6a, and 6b). As is well known in the art, a projection lens system 206 can include numerous lenses of different curvatures and materials. Different projection lens systems 206 are chosen based on physical constraints and on anticipated use.

Figure 4:
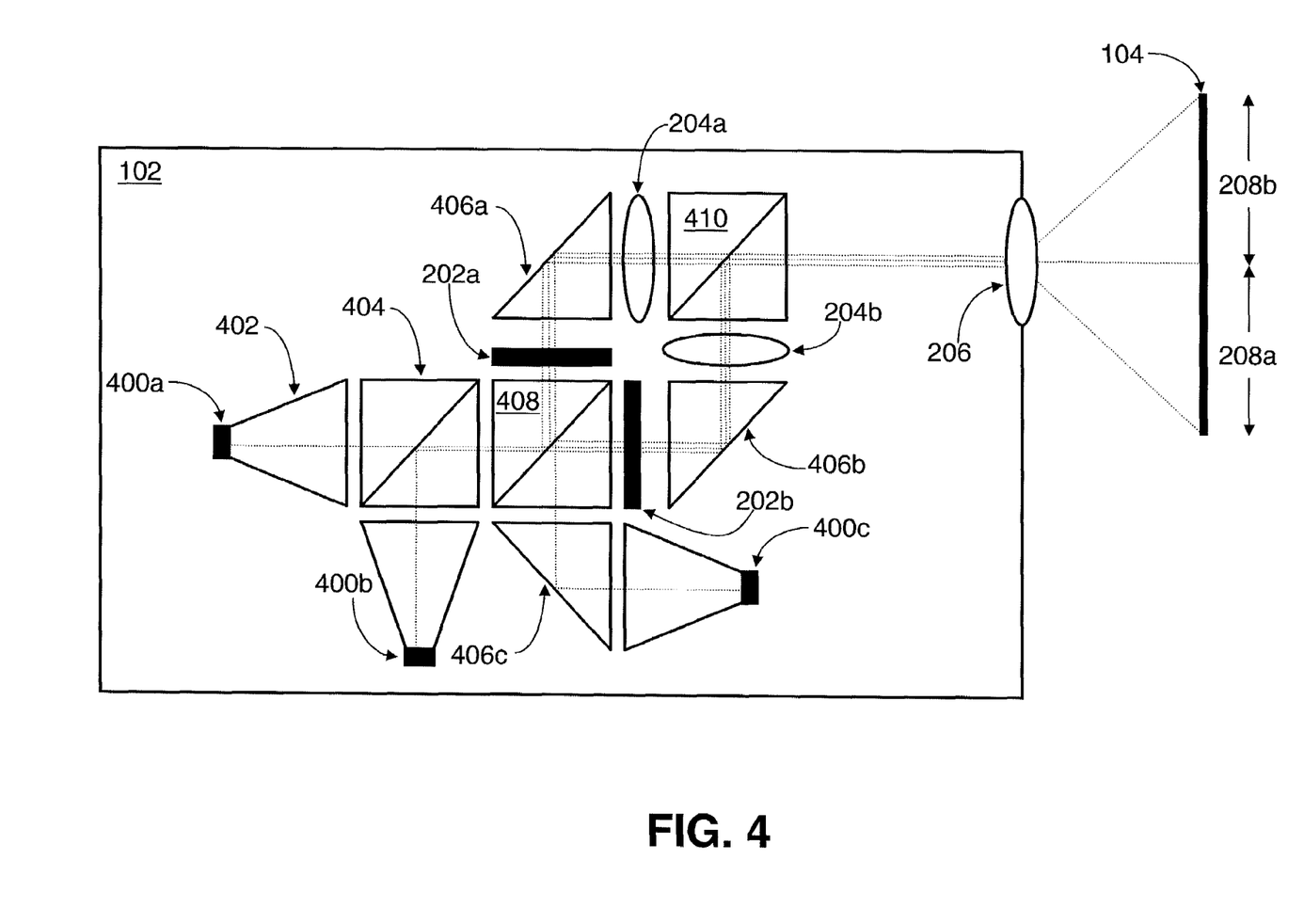
FIG. 4 is a schematic of an exemplary two-imager microprojector that efficiently uses polarized light.

FIG. 4 shows an embodiment of the present invention that doubles the lighting efficiency of many previous devices. The illumination system here includes three light sources 400a, 400b, and 400c. Each source 400a, 400b, and 400c produces unpolarized light of one color, while the combination of sources usefully covers the visible spectrum (e.g., one source produces red light, one green, and one blue). In some embodiments, each source 400a, 400b, and 400c is a light-emitting diode. Light from the three monochromatic sources 400*a*, 400*b*, and 400*c* is directed, possibly via light tunnels such as 402, and combined together. In the example of FIG. 4, two colors are first combined in a dichroic beamsplitter 404, and then the combination of the two colors is combined with the third color in a first polarizing beamsplitter 408. Two polarized light beams leave the first beamsplitter 408 (Step 302 of FIG. 3), one directed toward a first imager 202*a*, and the other directed toward a second imager 202*b*. Each polarized beam leaving the first beamsplitter 408 includes light of all three colors.

Typical imagers 202*a* and 202*b* are liquid-crystal devices that require polarized light. Because illumination systems typically produce unpolarized light, many previous systems filter their generated light through a polarizer before directing it to an imager. This technique, however, throws away all of the incipient light whose polarization is not aligned with that of the polarizer. This results in a loss of about 50% of the original light. In the system of FIG. 4, on the other hand, the first polarizing beamsplitter 408 uses all of the light directed to it, either in the beam directed toward the first imager 202*a* or in the other beam directed toward the other imager 202*b*.

As discussed above in relation to FIG. 2, the imagers 202*a* and 202*b* modulate the light directed through them to imprint the light with portions of the final image 104. Depending upon the physical layout of the components, the modulated light may be directed by total-internal-reflective prisms 406*a* and 406*b* as it travels to the relay lenses 204*a* and 204*b*. Upon leaving the relay lenses 204*a* and 204*b*, the modulated light is still polarized. Therefore, a second polarizing beamsplitter 410 can be used to direct all of the relayed light to the projection lens system 206.

By using essentially all of the light produced by the sources 400*a*, 400*b*, and 400*c*, the embodiment of FIG. 4 is approximately twice as light- and power-efficient as previous systems. In response to specific packaging and other constraints, known optical techniques can be used to rearrange the components of FIG. 4 without departing from the teachings of the present invention. For example, reflective imagers can replace the transmissive imagers 202*a* and 202*b*, and the two beamsplitters 408 and 410 can sometimes be combined into one component.

Figure 5A:
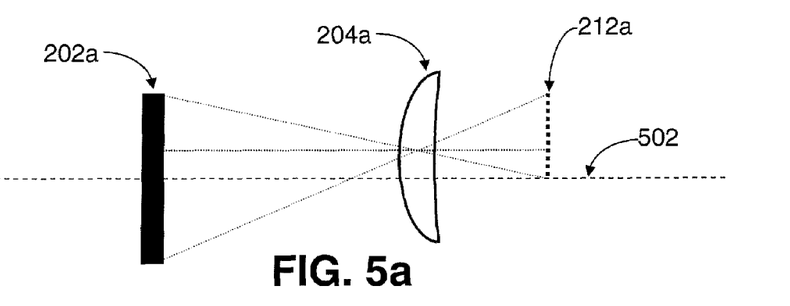
FIGS. 5a, 5b, and 5c are optical-path diagrams showing how relay lenses tile intermediate images together.
Figure 5B:
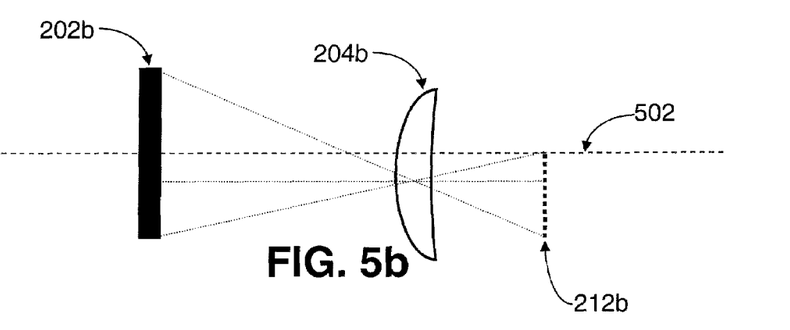
Figure 5C:
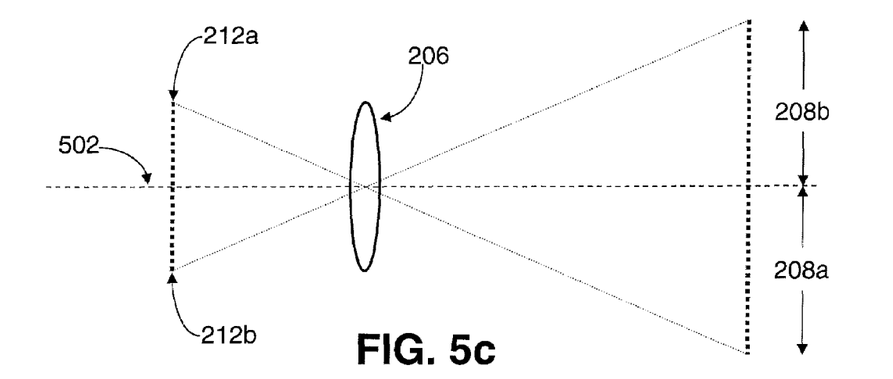

FIGS. 5*a*, 5*b*, and 5*c* illustrate how, in some embodiments, the relay lenses 204*a* and 204*b* combine the image portions made by the individual imagers 202*a* and 202*b*. FIG. 5*a* shows the light modulated by the imager 202*a* directed toward the relay lens 204*a*. The imager 202*a* is approximately centered above and below the optical center line 502 of the projection lens system 206 (not shown in FIG. 5*a*). However, the relay lens 204*a* directs the image portion 212*a* created by this imager 202*a* so that it lies entirely above the optical center line 502. Thus, the relay lens 204*a* both positions the image portion 212*a* and "shrinks" the vertical dimension of the image portion 212*a* so that it fits entirely above the optical center line 502. In the example of FIG. 5*a*, the image portion 212*a* is approximately half the height of the imager 202*a*. (In FIGS. 5*a*, 5*b*, and 5*c*, "vertical" and "height" are used in reference only to the figures themselves.)

FIG. 5*b* is similar to FIG. 5*a* but shows the other imager 202*b* and its associated relay lens 204*b*. Like the first imager 202*a*, the imager 202*b* is also approximately centered above and below the optical center line 502. Its relay lens 204*b* shrinks the image portion 212*b* and directs it to lie entirely below the optical center line 502.

FIG. 5*c* combines the results of FIGS. 5*a* and 5*b* to show how the two image portions 212*a* and 212*b* are "tiled" together about the optical center line 502. Because the relay lenses 204*a* and 204*b* "shrink" the image portions 212*a* and 212*b*, these image portions 212*a* and 212*b* can be tiled together in a height that approximates the height of each imager 202*a* and 202*b*. The projection lens system 206 then projects the tiled image out of the personal portable device 102. The internal image portions 212*a* and 212*b* are projected to become the portions 208*a* and 208*b* that are seamlessly combined in the projected image 104.

FIGS. 5*a*, 5*b*, and 5*c* show how the use of relay lenses 204*a* and 204*b* allows the imagers 202*a* and 202*b* to each have a vertical dimension approximately equal to that of the projection lens system 206. As shown in FIGS. 2 and 4, the individual imagers 202*a* and 202*b* are not stacked on top of one another, but can be placed in some kind of side-by-side arrangement. Thus, the relay lenses 204*a* and 204*b* enable the increased resolution provided by the multiple imagers 202*a* and 202*b* without increasing the thickness of the personal portable device 102.

Another aspect of the present invention is illustrated in FIG. 5*c*. In many previous multiple-imager projection systems, the partial images are only combined outside the device housing the projection system, that is, they are combined on the projection screen (or wall or whatever). The alignment of the partial images into one image is then dependent upon the distance between the projection lens and the screen. In contrast to these previous systems, embodiments of the present invention tile the partial images 212*a* and 212*b* together within the personal portable device 102, specifically, they are tiled together before they reach the projection lens system 206. This arrangement allows the tiling to be carefully aligned and permanently set during manufacture, yielding a much more robust system whose alignment is independent of the environment outside of the personal portable device 102. This arrangement also allows the use of simple optical design to reduce complexity for seamlessly tiling the two images on the final projection screen.

Figure 6A:
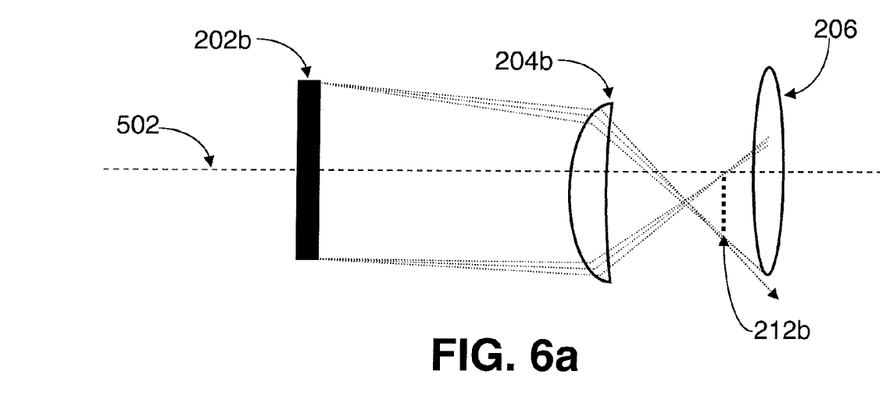
FIGS. 6a and 6b are optical-path diagrams showing the effects of an optical diffuser.
Figure 6B:
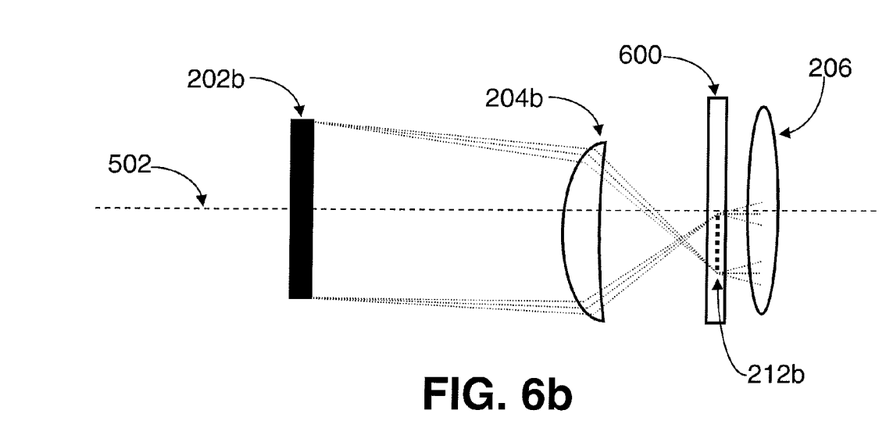

FIGS. 6*a* and 6*b* show a feature of some embodiments of the present invention. FIG. 6*a* shows that some of the light from the imager 202*b*, after passing through the relay lens 204*b* and creating the image portion 212*b*, may miss the projection lens system 206 entirely and be wasted (thus reducing the power efficiency of the microprojector). Also, light from different areas of the imager 202*b* enters the projection lens system 206 at different angles, possibly leading to non-uniform lighting in the final projected image 104. In FIG. 6*b*, an optical diffuser 600 is added at the location of the image portion 212*b* (Step 308 of FIG. 3). The optical diffuser 600 redirects incident light so that it travels in a cone directly toward the projection lens system 206. As a result, more light from the relay lens 204*b* reaches the projection lens system 206. The projected image 104 is also more evenly lit because light leaves the optical diffuser 600 in a consistent cone regardless of where on the imager 202*b* the light comes from. In some embodiments, the optical diffuser 600 is designed to blend light from the different imagers 202*a* and 202*b* so as to effectively eliminate any seam between the image portions 212*a* and 212*b*.

In view of the many possible embodiments to which the principles of the present invention may be applied, it should be recognized that the embodiments described herein with respect to the drawing figures are meant to be illustrative only and should not be taken as limiting the scope of the invention. For example, the light paths in the figures are only meant to illustrate the functions of the various components and are not meant to be definitive. Other arrangements of the optical components shown in the figures and the addition of other known optical components are possible and may be called for in various environments. Therefore, the invention as described herein contemplates all such embodiments as may come within the scope of the following claims and equivalents thereof.

We claim:

1. An image projector comprising:
   an illumination system configured for directing light along paths toward each of a plurality of imagers;
   the plurality of imagers, each imager configured for creating an intermediate image in a light path;
   a plurality of relay lenses, wherein for each imager, a relay lens is configured for relaying the intermediate image created by the imager in a light path toward a projection lens system, and wherein the intermediate images are tiled into a combined image; and
   the projection lens system configured for projecting the combined image.

2. The image projector of claim 1 wherein the illumination system comprises a first polarizing beamsplitter configured for splitting light into a plurality of polarized-light paths, each polarized-light path leading toward an imager, wherein for each imager, a polarizing direction of the imager is aligned with incoming polarized light.

3. The image projector of claim 2 further comprising:
   a second polarizing beamsplitter configured for combining light from the relay lenses and for directing the combination of light toward the projection lens system.

4. The image projector of claim 1 wherein the illumination system comprises a plurality of monochromatic light sources.

5. The image projector of claim 4 wherein each monochromatic light source is selected from the group consisting of: a light-emitting diode and a laser.

6. The image projector of claim 1 wherein the illumination system comprises a white-light source.

7. The image projector of claim 1 wherein a sum of vertical dimensions of the intermediate images, after relaying, is no greater than a vertical dimension of an imager.

8. The image projector of claim 1 comprising exactly two imagers and exactly two relay lenses.

9. The image projector of claim 1 wherein a resolution of the combined image is a sum of resolutions of the intermediate images.

10. The image projector of claim 9 wherein the resolution of the combined image is a product of a horizontal resolution of the combined image and a vertical resolution of the combined image, wherein the horizontal resolution of the combined image equals a horizontal resolution of each intermediate image, and wherein the vertical resolution of the combined image equals a sum of vertical resolutions of the intermediate images.

11. The image projector of claim 1 wherein each imager is selected from the group consisting of: a reflective imager and a transmissive imager.

12. The image projector of claim 1 further comprising:
    a diffuser located in a light path where an intermediate image is created.

* * * * *